(12) United States Patent
Choi et al.

(10) Patent No.: US 11,951,508 B2
(45) Date of Patent: Apr. 9, 2024

(54) ELECTRODE SLURRY-DISCHARGING SHIM ALLOWING EVEN COATING, AND COATING DIE COMPRISING SAME

(71) Applicant: LG Energy Solution, Ltd., Seoul (KR)

(72) Inventors: Jong Hwan Choi, Daejeon (KR); In Seong Kim, Daejeon (KR); Min Cheol Choi, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 8 days.

(21) Appl. No.: 17/639,774

(22) PCT Filed: Dec. 18, 2020

(86) PCT No.: PCT/KR2020/018625
§ 371 (c)(1),
(2) Date: Mar. 2, 2022

(87) PCT Pub. No.: WO2021/132992
PCT Pub. Date: Jul. 1, 2021

(65) Prior Publication Data
US 2022/0331832 A1  Oct. 20, 2022

(30) Foreign Application Priority Data
Dec. 27, 2019  (KR) .................. 10-2019-0175849

(51) Int. Cl.
*B05C 5/02*  (2006.01)
*B05C 13/02*  (2006.01)
*H01M 4/04*  (2006.01)

(52) U.S. Cl.
CPC .......... *B05C 5/0254* (2013.01); *B05C 5/0262* (2013.01); *B05C 13/02* (2013.01); *H01M 4/0404* (2013.01)

(58) Field of Classification Search
None
See application file for complete search history.

(56) References Cited

U.S. PATENT DOCUMENTS

2015/0165470 A1    6/2015  Kuniyasu et al.

FOREIGN PATENT DOCUMENTS

| CN | 104069985 A | 10/2014 |
| CN | 106007391 A | 10/2016 |
| CN | 206673019 U | 11/2017 |
| JP | H07171486 A | 7/1995 |

(Continued)

OTHER PUBLICATIONS

Extended European Search Report for Application No. 20908345.0 dated Mar. 21, 2022. 8 pgs.

(Continued)

*Primary Examiner* — Charles Capozzi
(74) *Attorney, Agent, or Firm* — Lerner David LLP

(57) ABSTRACT

The present technology relates to an electrode slurry-discharging shim, and a coating die comprising same, the present technology allowing superbly even coating to be assured even when the electrode slurry coating is at a high load level. In one example, the present technology provides a coating shim for electrode slurry discharge according to the present invention having a step portion configured to be formed at an end of an electrode slurry discharge flow path and to increase a width of the discharge flow path, and the step portion is formed at opposite sides in a width direction of the electrode slurry discharge flow path.

5 Claims, 2 Drawing Sheets

(56) References Cited

FOREIGN PATENT DOCUMENTS

| | | |
|---|---|---|
| JP | H09248508 A | 9/1997 |
| JP | H09253555 A | 9/1997 |
| JP | 2000231206 A | 8/2000 |
| JP | 2006255643 A | 9/2006 |
| JP | 2008036624 A | 2/2008 |
| JP | 2010051953 A | 3/2010 |
| JP | 2010086811 A | 4/2010 |
| JP | 2010264329 A | 11/2010 |
| JP | 2014233651 A | 12/2014 |
| JP | 2015112572 A | 6/2015 |
| JP | 2015136675 A | 7/2015 |
| JP | 2015182019 A | 10/2015 |
| JP | 2015229151 A | 12/2015 |
| JP | 2016012549 A | 1/2016 |
| JP | 2018089599 A | 6/2018 |
| KR | 20120075850 A | 7/2012 |
| KR | 20120119626 A | 10/2012 |
| KR | 20130098758 A | 9/2013 |
| KR | 20150031036 A | 3/2015 |
| KR | 20160115420 A | 10/2016 |
| KR | 20160115707 A | 10/2016 |
| KR | 20170136311 A | 12/2017 |
| KR | 20190021698 A | 3/2019 |
| KR | 102035826 B1 | 10/2019 |

OTHER PUBLICATIONS

International Search Report for Application No. PCT/KR2020/018625 dated Mar. 30, 2021, pp. 1-3.
Search Report dated May 19, 2022 from the Office Action for Chinese Application No. 2020800197352 dated May 25, 2022, 1 pg.

【FIG. 1】
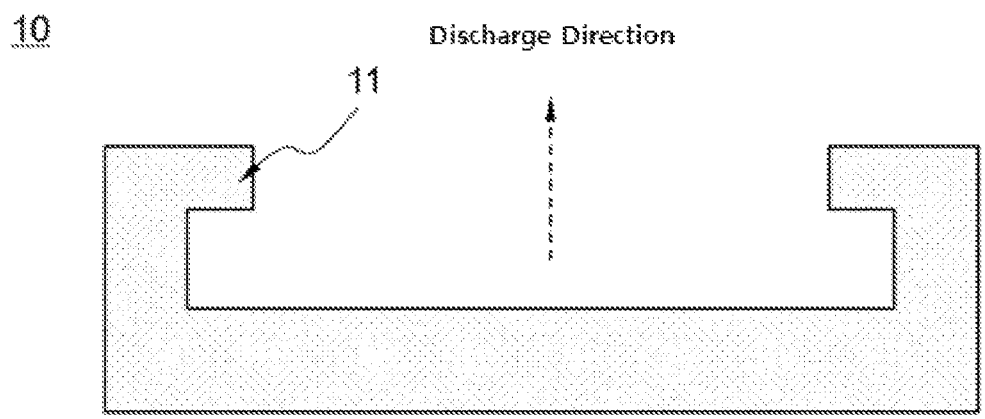
【FIG. 2】
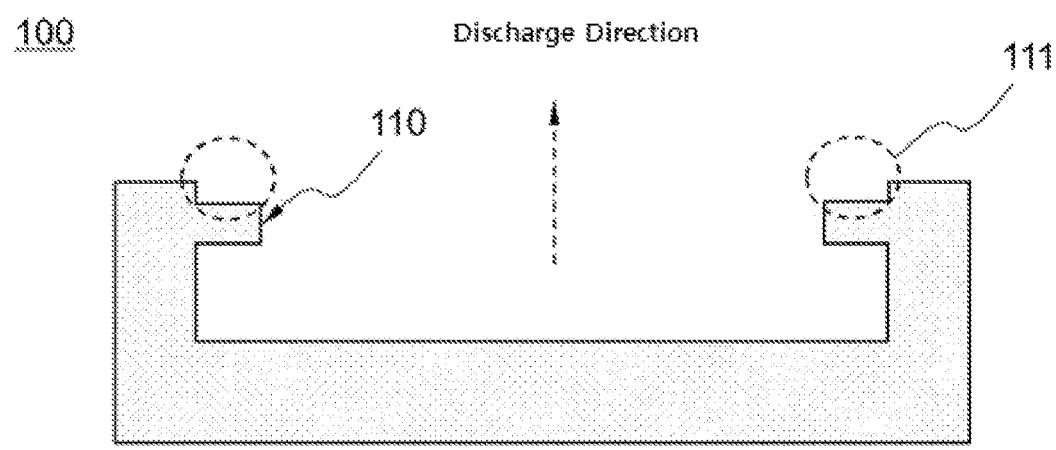

[FIG. 3]
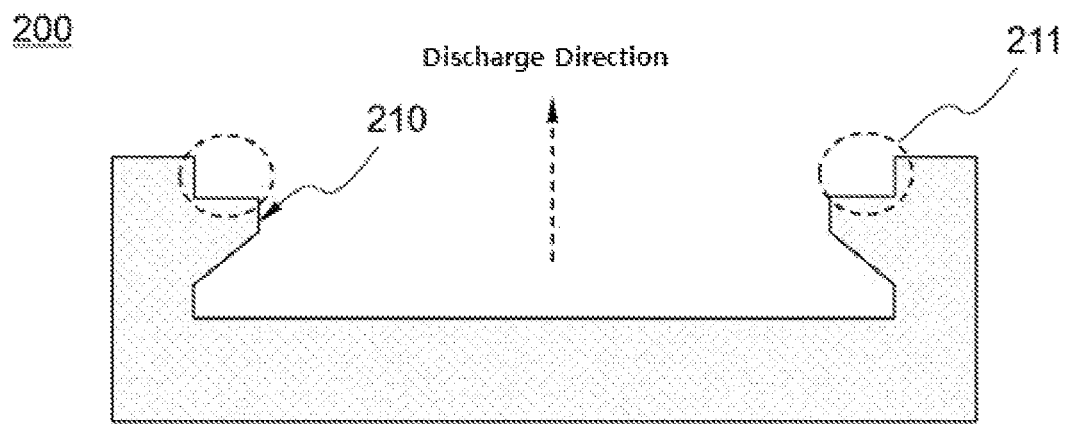
[FIG. 4]
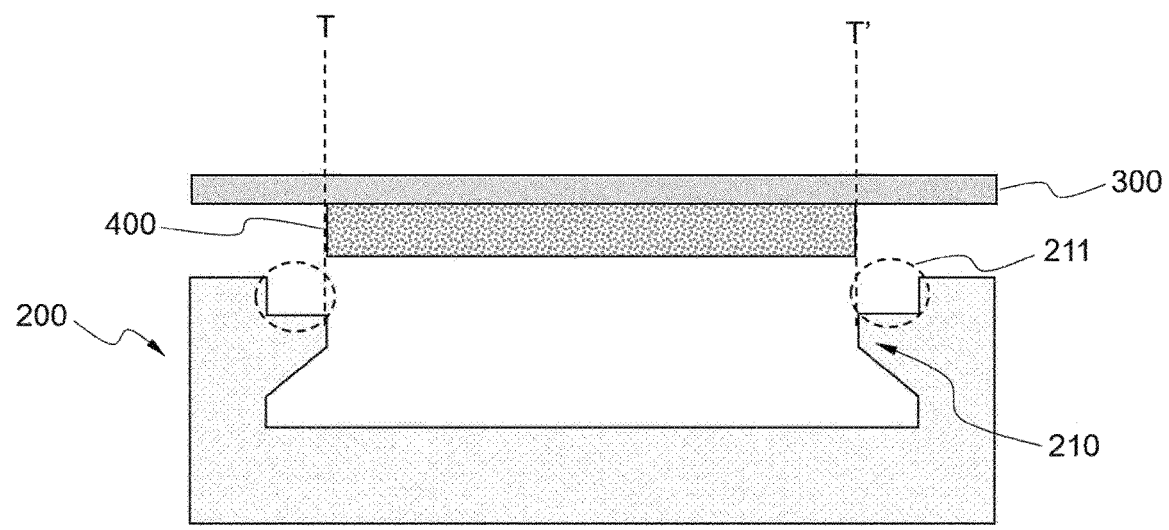

ELECTRODE SLURRY-DISCHARGING SHIM ALLOWING EVEN COATING, AND COATING DIE COMPRISING SAME

CROSS-REFERENCE TO RELATED APPLICATIONS

This application is a national phase entry under 35 U.S.C. § 371 of International Application No. PCT/KR2020/018625, filed on Dec. 18, 2020, which claims priority from Korean Patent Application No. 10-2019-0175849, filed on Dec. 27, 2019, the disclosures of which are incorporated herein by reference in their entirety.

TECHNICAL FIELD

The present invention relates to a coating shim for electrode slurry discharge with an excellent coating uniformity and a coating die including the same.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

As the field of application for secondary batteries expands, the demand for higher-capacity secondary batteries is increasing rapidly. As a method of increasing the capacity of the secondary battery, research on the technique of increasing the loading amount of the electrode mixture layer is being performed. The electrode for the secondary battery is prepared through the drying and rolling process after coating the electrode slurry on the current collector. However, in order to increase the loading amount of the electrode mixture layer, a large amount of electrode slurry should be coated on the current collector. In order to increase the coating amount of the electrode slurry, a higher level of coating uniformity is required.

FIG. 1 is a plan view showing a conventional coating shim. Referring to FIG. 1, a conventional coating shim 10 is opened in the discharge direction of the electrode slurry, based on the cross-sectional structure, and the other three sides except for the side in the discharge direction are closed. Further, in the coating shim 10, a guide portion 11 is formed at opposite ends in the width direction of the open surface in the discharge direction of the electrode slurry. The guide portion 11 has a structure protruding in a direction in which a width of the discharge flow path is reduced.

When a high loading coating is performed using the coating shim 10 of FIG. 1, a load is applied to opposite ends in the coating width direction. The load applied to opposite ends in the coating width direction lowers the coating uniformity and increases the deviation of the loading amount by coated regions. Further, after coating the electrode slurry on the entire electrode current collector, the process of rolling is performed. In a state that the electrode slurry is unevenly coated on the electrode current collector, the rolling is performed with a high pressure, the balance and capacity of the battery cell are lowered, and there is a risk of disconnection in case of severe cases.

Therefore, in the case of electrode slurry coatings, there is a need for a technique capable of implementing excellent coating uniformity even when high-loading.

DISCLOSURE

Technical Problem

The present invention has been created to solve the above problems, and an object of the present invention is to provide a coating shim for discharging an electrode slurry capable of securing excellent coating uniformity at a high loading coating, and a coating die including the same.

Technical Solution

The present invention provides a coating shim for electrode slurry discharge. In one example, a coating shim for electrode slurry discharge according to the present invention has a step portion configured to be formed at an end of an electrode slurry discharge flow path and increase a width of the discharge flow path, and the step portion is formed at opposite sides in a width direction of the electrode slurry discharge flow path.

In one example, a discharge direction of the electrode slurry is opened on a basis of a cross-sectional structure, there is provided a guide portion having a structure protruding in a direction that decreases the width of the discharge flow path is formed at opposite ends in a width direction of an open surface of the discharge direction of the electrode slurry, and there is provided a step portion configured to be formed at the end of the electrode slurry discharge flow path and increase the width of the discharge flow path.

In further another example, the step portion is formed in a vertically bent shape at an end of the discharge direction of the guide portion and temporarily increases the width of the discharge flow path.

In a specific example, a width of the discharge flow path, which increases by formation of the step portion, is in a range of 0.5 to 10% on a basis of width direction length of the discharge flow path.

In further another example, the guide portion has a shape in which a height protruding in a discharge direction sequentially or continuously increases.

Further, the present invention provides an electrode slurry coating die including the above described coating shim. In one example, the electrode slurry coating die according to the present invention includes: die blocks adjacent to each other; and a coating shim configured to be inserted into an interface between the die blocks.

In one example, a discharge direction of the electrode slurry of the coating shim is opened on a basis of a cross-sectional structure, there is provided a guide portion having a structure protruding in a direction that decreases the width of the discharge flow path is formed at opposite ends in a width direction of an open surface of the discharge direction of the electrode slurry, and there is provided a step portion configured to be formed at the end of the electrode slurry discharge flow path and increase the width of the discharge flow path.

In a specific example, in the electrode slurry coating die, a width of the coating is determined by an interval between guide portions of the coating shim.

In further another specific example, the width of the coating is determined by the interval between guide portions of the coating shim, and an electrode slurry discharge flow path formed at a position corresponding to a step portion of the coating shim is further provided.

Advantageous Effects

According to an electrode slurry coating shim and a coating die including the same according to the present invention, excellent coating uniformity can be implemented even when the electrode slurry is coated with a high level of loading amount.

BRIEF DESCRIPTION OF THE DRAWINGS

FIG. 1 is a plan view of a conventional coating shim for electrode slurry discharge.

FIGS. 2 and 3 are plan views of coating shims for electrode slurry discharge according to an embodiment of the present invention, respectively.

FIG. 4 is a schematic diagram illustrating an electrode slurry coating process using an electrode slurry coating die according to an embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention provides a coating shim for electrode slurry discharge. In one embodiment, the coating shim for electrode slurry discharge according to the present invention includes a step portion which is formed at the end of the electrode slurry discharge flow path and increases the width of the discharge flow path.

In the present invention, a step portion for increasing the width of the discharge flow path is formed at the end of the discharge flow path of the coating shim. Through the formation of the step portion, it is possible to solve the load on opposite sides of the width direction during coating. Further, when the electrode slurry is discharged using the coating shim, the coating uniformity of the electrode slurry can be increased. When the coating shim according to the present invention is applied, the coating uniformity can be increased even when the electrode slurry is coated with a high loading amount. The coating layer excellent in coating uniformity can be obtained by preventing a phenomenon in which the thickness is changed by regions or disconnection occurs even if the drying and rolling process is performed later.

In one example, a discharge direction of the electrode slurry is opened on a basis of a cross-sectional structure, there is provided a guide portion having a structure protruding in a direction that decreases the width of the discharge flow path is formed at opposite ends in a width direction of an open surface of the discharge direction of the electrode slurry, and there is provided a step portion configured to be formed at the end of the electrode slurry discharge flow path and increase the width of the discharge flow path. When the coating shim is mounted on the coating die, the electrode slurry is supplied in the direction perpendicular to the discharge direction of the coating shim. The supplied electrode slurry is discharged in the discharge direction of the coating shim. At this time, by forming a guide portion, the coating width is controlled. The guide portion has a structure protruding in a direction in which a width of the discharge flow path is reduced. The present invention includes a structure in which a step portion is formed at the end in the discharge direction of the guide portion.

In yet another embodiment, the step portion is formed on opposite sides of the width direction of the electrode slurry discharge flow path. The coating shim for the electrode slurry discharge according to the present invention forms step portions on opposite sides at the end of the discharge flow path, and the step portions uniformly remove or reduce the load applied to opposite ends of the discharge flow path.

In one embodiment, the step portion is formed in a vertical bent shape at the end of the discharge direction of the guide portion, and the width of the discharge flow path increases at a time. In the coating shim according to the present invention, the step portion is formed in a vertical bent shape at the end in the discharge direction. This provides a temporary and rapid decompression condition just before the electrode slurry is discharged.

In a specific embodiment, the width of the discharge flow path to be increased by forming the step portion is in the range of 0.5 to 10%, based on the width direction length of the discharge flow path. More specifically, the width of the discharge flow path to be increased by the formation of the step portion is in the range of 0.5 to 5%, 3 to 10%, or 3 to 8%, based on the width direction length of the discharge flow path. The increase value of the discharge flow path by the step portion indicates the ratio of the length in the width direction of the discharge flow path, which is increased as by formation of the step portion, to the length in the width direction of the entire discharge flow path including the step portion. The range of the increased width of the discharge flow path by the step portion reflects the discharge efficiency and coating uniformity.

In another example, the guide portion has a shape in which a height protruding in a discharge direction sequentially or continuously increases. The guide portion has a structure protruding in a direction in which a width of the discharge flow path is reduced. If the guide portion is formed at a right angle to the discharge direction, the load is rapidly applied to opposite ends in the width direction of the discharge flow path, and in some cases, a partial reflux phenomenon may be caused. In the present invention, by forming the guide portion to allow the protruding height to be sequentially or continuously increased in the discharge direction, such a phenomenon can be reduced or blocked. For example, the guide portion may have a protruding structure so as to have an average inclination angle of about 5° to 45° for the discharge direction.

Further, the present invention provides an electrode slurry coating die including the above described coating shim.

In one example, the electrode slurry coating die according to the present invention includes: die blocks adjacent to each other; and a coating shim configured to be inserted into an interface between the die blocks. The coating die may include two die blocks 2P adjacent to each other, and in some cases, it is possible to include four die blocks 4P adjacent to each other. For example, the coating die may have a structure in which first to fourth die blocks are adjacent to each other and a structure in which a coating shim is inserted into a space between the first and second die blocks and a space between the third and fourth die blocks. In the case of including four die blocks 4P, the electrode slurry is sequentially coated on the current collector layer, which can form an electrode mixture layer of the double layer structure.

In another example, a discharge direction of the electrode slurry of the coating shim is opened on a basis of a cross-sectional structure, there is provided a guide portion having a structure protruding in a direction that decreases the width of the discharge flow path is formed at opposite ends in a width direction of an open surface of the discharge direction of the electrode slurry, and there is provided a step portion configured to be formed at the end of the electrode slurry discharge flow path and increase the width of the discharge flow path.

As described above, the coating shim controls the width of the discharge flow path by forming the guide portion. The present invention includes a structure in which a step portion is formed at the end in the discharge direction of the guide portion. Thus, the coating die according to the present invention may control the width of the coating and prevent an unnecessary load from being applied on opposite ends in the width direction.

In one embodiment, in an electrode slurry coating die according to the present invention, the width of the coating is determined by the interval between guide portions of the coating shim. In addition, the thickness of the coating corresponds to the thickness of the coating shim and is partially affected by the discharge pressure or the separation distance of the current collector layer. In the electrode slurry discharge according to the present invention, the coating width is determined by the interval between guide portions of the coating shim, and by forming a step portion at the end of the discharge flow path, the load is prevented from being excessively applied to a certain region, and the uniformity of the coating can be significantly increased. In one embodiment, the electrode slurry coating die further includes an electrode slurry discharge flow path formed at a position corresponding to the step portion of the coating shim. The uniformity of the coating is increased through the formation of the coating shim, and a part of the discharged electrode slurry may flow into the step portion side. In the present invention, by forming an electrode slurry discharge flow path formed at a step portion of the coating shim, it is possible to discharge or reuse the electrode slurry to be discharged to the step portion. For example, the electrode slurry discharge flow path formed at the position corresponding to the step portion may be fluidly connected to an electrode slurry supply unit of the electrode slurry coating die. This makes it possible to supply the electrode slurry discharged through the electrode slurry discharge flow path to the electrode slurry supply unit, and reuse the electrode slurry.

The electrode slurry coating die according to the present invention refers to an apparatus for discharging the electrode slurry to the current collector to form a coating layer. In the present invention, the coating shim for the electrode slurry discharge means a coating shim which is inserted into the interface between the die blocks constituting the coating die and is mounted thereon.

The electrode slurry is a generic term for a composition in a slurry state containing an electrode active material. The positive electrode or negative electrode means an electrode for a secondary battery, and specifically means an electrode for a lithium secondary battery.

In one example, the electrode means a positive electrode and/or a negative electrode of a lithium secondary battery.

The positive electrode has a structure in which a positive electrode active material layer of a two-layer structure is stacked on a positive electrode current collector. In one example, the positive electrode active material layer includes a positive electrode active material, a conductive material, and a binder polymer, and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0<y<1), $Li_xNi_{1-y}Mn_yO_2$ (0.5<x<1.3, O≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_z$ (0.5<x<1.3, 0<z<2), $Li_xCoPO_4$ (0.5<x<1.3) and $Li_xFePO_4$ (0.5<x<1.3), and the lithium-containing transition metal oxide may be coated with a metal or metal oxide such as aluminum (Al). Further, in addition to the lithium-containing transition metal oxide, at least one selected from the group consisting of sulfide, selenide, and halide may be used.

The positive electrode active material may be included in the range of 94.0 to 98.5 wt % in the positive electrode active material layer. When the content of the positive electrode active material satisfies the above range, it is advantageous in terms of manufacturing a high-capacity battery and providing sufficient conductivity of the positive electrode or adhesion between electrode materials.

The current collector used for the positive electrode is a metal having high conductivity, and any metal which the positive electrode active material slurry may be easily attached to and which is not reactive in the voltage range of the electrochemical device can be used. Specifically, non-limiting examples of the current collector for the positive electrode include aluminum, nickel, or a foil manufactured by a combination thereof.

The positive electrode active material layer further includes a conductive material. The conductive material is usually added in an amount of 1 to 30% by weight based on the total weight of the mixture including the positive electrode active material. Such a conductive material is not particularly limited as long as it has conductivity without causing a chemical change in the secondary battery. For example, one or more selected from the group consisting of graphite such as natural graphite or artificial graphite; carbon black such as carbon black, acetylene black, ketjen black, channel black, furnace black, lamp black, or thermal black; conductive fiber such as carbon fiber or metal fiber; metal powder such as carbon fluoride, aluminum, or nickel powder; conductive whiskey such as zinc oxide or potassium titanate; conductive metal oxide such as titanium oxide; and polyphenylene derivative may be used as the conductive material.

The negative electrode has a structure in which a negative electrode active material layer of a two-layer structure is stacked on a negative electrode current collector. In one example, the negative electrode active material layer includes a negative electrode active material, a conductive material, and a binder polymer, and if necessary, may further include a negative electrode additive commonly used in the art.

The negative electrode active material may include a carbon material, lithium metal, silicon or tin. When a carbon material is used as the negative electrode active material, composite low crystalline carbon and high crystalline carbon may be used. Representative examples of low crystalline carbon include soft carbon and hard carbon are typical. Representative examples of high crystalline carbon include one or more selected from the group consisting of natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials.

In addition, the negative electrode may include a conductive material and a binder commonly used in the art.

Hereinafter, the present invention will be described in more detail through drawings and examples. As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

First Embodiment

FIG. 2 is a plan view of a coating shim for electrode slurry discharge according to an embodiment of the present invention. Referring to FIG. 2, the coating shim 100 is opened in the discharge direction of the electrode slurry, based on the horizontal direction cross-sectional structure, and the other three sides except for the side in the discharge direction are closed. Further, in the coating shim 100, a guide portion 110 having a structure protruding in a direction that decreases the width of the discharge flow path is formed at opposite ends in the width direction of the open surface in the electrode slurry discharge direction, and a step portion 111, which increases the width of the discharge flow path is formed at the end in the discharge direction of the guide portion 110. The width of the coating by the electrode slurry discharge in the coating shim 100 is determined by the interval between the guide portions 110 and increases the coating uniformity of the electrode slurry discharged by the step portion 111.

Second Embodiment

FIG. 3 is a plan view of a coating shim for electrode slurry discharge according to another embodiment of the present invention. Referring to FIG. 3, the coating shim 200 is opened in the discharge direction of the electrode slurry, based on the horizontal direction cross-sectional structure, and the other three sides except for the side in the discharge direction are closed. Further, in the coating shim 200, a guide portion 210 having a structure protruding in a direction that decreases the width of the discharge flow path is formed at opposite ends in the width direction of the open surface in the electrode slurry discharge direction, and a step portion 211, which increases the width of the discharge flow path is formed at the end in the discharge direction of the guide portion 210. The guide portion 210 has a shape in which the height protruding in the discharge direction continuously increases. Through this, as the width in the width direction of the electrode slurry discharged through the coating shim 200 continuously decreases, a rapid increase in the load on opposite ends in the width direction is prevented. Further, the coating uniformity of the electrode slurry discharged by the step portion 211 is enhanced.

Third Embodiment

FIG. 4 is a schematic diagram illustrating an electrode slurry coating process using an electrode slurry coating die according to an embodiment of the present invention. Referring to FIG. 4, a coating die according to the present invention has a structure in which the coating shim 200 is inserted on an interface between adjacent die blocks (not shown). The coating shim 200 is one of the factors that control the coating width and thickness by the discharged electrode slurry.

Specifically, the electrode slurry is discharged to the current collector layer 300 which is moved in a state that is spaced apart from the discharge port of the coating die at regular intervals. The current collector layer 300 is moved by a conveyor (not shown). The discharged electrode slurry is coated on the current collector layer 300 to thereby form an electrode mixture layer 400. The electrode mixture layer 400 is formed on the current collector layer 300 with a width indicated by T-T' corresponding to the width of the discharge port of the coating die. On the other hand, it can be seen that the width of the electrode mixture layer 400 corresponds to the interval between the guide portions 210 of the coating shim 200. In the present invention, the guide portion 210 is formed on opposite sides of the discharge direction end of the coating shim 200 to control the coating width, and by adding a step portion 211 to the discharge direction end of the guide portion 210, a rapid increase in the load on opposite ends in the width direction of the discharged electrode slurry is prevented, and the coating uniformity is increased. As another example, by forming an electrode slurry discharge flow path (not shown) at a position corresponding to the step portion 111, it is possible to discharge a part of the electrode slurry through the flow path.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS 10, 100, 200: coating shim
11, 110, 210: guide portion
111, 211: step portion
300: current collector layer
400: electrode mixture layer

The invention claimed is:

1. A coating shim for electrode slurry discharge, comprising:
   an open side in a discharge direction of the electrode slurry based on a cross-sectional structure of the coating shim;
   a guide portion formed at opposite sides of the coating shim and having a structure protruding in a width direction of the open side of the coating shim so as to decrease a width of an electrode slurry discharge flow path,
      wherein the guide portion has a shape in which a height protruding in the width direction of the discharge flow path increases continuously along the discharge direction from an upstream edge of the guide portion to reach a maximum height;
   a step portion formed vertically to an end of the electrode slurry discharge flow path so as to increase the width of the discharge flow path; and a horizontal portion connecting a downstream edge of the guide portion and the vertically formed step portion,
wherein the step portion is formed at opposite sides in the width direction of the electrode slurry discharge flow path,
wherein the width of the discharge flow path formed by the step portion at the end of the discharge flow path is in a range of 0.5 to 10% greater than a beginning width direction length of the discharge flow path.

2. An electrode slurry coating die including the coating shim according to claim 1.

3. The coating die of claim 2, further comprising die blocks adjacent to each other; and the coating shim configured to be inserted into an interface between the die blocks.

4. The coating die of claim 2, wherein in the electrode slurry coating die, a width of an applied electrode slurry layer is determined by an interval between the guide portions of the coating shim.

5. The coating die of claim 2, wherein the width of an applied electrode slurry layer is determined by the interval between the guide portions of the coating shim, and the electrode slurry discharge flow path formed at a position corresponding to the step portion of the coating shim is further provided.

* * * * *